Patented Jan. 19, 1943

2,308,903

UNITED STATES PATENT OFFICE 2,308,903

PROCESS FOR THE PRODUCTION OF THE CARBON CHLORIDE COMPOUNDS C₄CL₆

Josef Wimmer, Muckenberg, District of Liebenwerda, Germany; vested in the Alien Property Custodian No Drawing. Application May 18, 1940, Serial No. 336,005. In Germany June 3, 1939

5 Claims. (Cl. 260—655)

The invention relates to a process for the production of the carbon-chloride compound C₄Cl₆ as set forth in Mugdan and Wimmer application S. N. 199,290, filed March 31, 1938. (Patent #2,269,600, issued January 13, 1942.)

As shown in that application, hexachlorbutene can, by heating in the presence of certain metal chloride catalysts, especially ferric chloride and antimony chloride, be caused to split off two mols of HCl and absorb one mol of chlorine, to produce a new compound of the formula C₄Cl₆. The steps, that is, the splitting off of each mol of HCl and the addition of the chlorine, may be carried out in any desired order.

I have now found that in the place of dimeric trichlorethylene as starting material in the process described above, it is possible to use chlorinated hydrocarbons such as occur in waste products of chemical processes and distillations, especially in the distillation residues of technical tetrachlorethane and trichlorethylene. The chief constituents of these residues, in addition to hexachlorethane are 1.1.2.3.4.4-hexachlorbutane and 1.2.3.4-tetrachlorbutadien, and other chlorinated hydrocarbons which are formed from these materials during the production of tetrachlorethane—and trichlorethylene. The method of working according to the above application S. N. 199,290 can be applied without difficulty to these mixtures of chlorinated hydrocarbons, it being desirable first to free them of the lowest and highest boiling constituents. The end point of the reaction can be recognized by the fact that the reaction liquid neither absorbs any further chlorine nor splits off any further HCl.

*Example.*—From the above mentioned technical trichlorethylene residue firstly the low boiling C₂ chlorinated hydrocarbons, especially tetrachlorethylene, were fractioned off. Then the constituent of the highest boiling fraction which could be distilled, was distilled over at reduced pressure. From 10 kg. of the starting material 7–9 kg. of this purified residue were obtained according to the conditions under which the residue of distillation was obtained. 3 kg. of this residue were mixed with 3 g. of ferric chloride and treated with chlorine at 70–80° C. After having completed the absorption of chlorine, the temperature was gradually increased to about 170° C. The splitting off of HCl began at 100° C. and was very active at 140° C. When the splitting off of HCl had nearly ceased the reaction product was treated with chlorine again and heated for the splitting off of HCl. The end of this reaction process could be recognized by the fact that the reaction liquid neither absorbed any further chlorine, nor split off HCl. The end product then contained: 2.7 kg. C₄Cl₆ and 0.8 kg. hexachlorethane. The hexachlorethane was partly present in the starting material, partly it was formed at the chlorination by the decomposition of the C₄— chain.

From mixture of the hexachlorbutadien and hexachlorethane first obtained the hexachlorethane can be entirely separated, under suitable conditions.

If necessary one part of the hexachlorethane can be eliminated by freezing out, but it is also possible to fractionate all the hexachlorethane directly. The difficulty in this procedure is that the hexachlorethane crystallizes out in the condenser and tends to clog the condenser. Therefore it is preferable to proceed in this way: The vapours of the hexachlorethane are not condensed by cooling down from the outside but by a direct injection of cold water into the condensation tube which is employed for this purpose. It is also possible to mix the crude product with a liquid having nearly the same boiling point as the hexachlorethane and the property of dissolving the hexachlorethane satisfactorily. In this way too a choking of the condenser is avoided. It is possible to use as an auxiliary liquid for this purpose the lowest boiling constituent of the trichlorethylene residue which is freed from ethane derivatives.

In this manner or by similar measures, the hexachlorbutadien product can easily be prepared in a pure state.

If the reaction temperatures are sufficiently high, the chlorination and the splitting off of HCl can be carried out at the same time. It is also possible to begin with a splitting off of HCl and then continue with the chlorination. Other variations are also possible. Preferably, when residues of tetrachlorethane are treated, the first step is a splitting off of HCl.

The residues of trichlorethylene and tetrachlorethane have been a useless waste product up to now, and their removal or destruction was very difficult because of the insolubility and non-combustibility of such waste. The process of my invention enables these former waste products to be converted into a pure, stable substance, for which a useful application exists.

What is claimed is:

1. Process for producing a carbon-chloride of the formula C₄Cl₆ which comprises heating waste products of chemical processes and distillations containing chlorinated hydrocarbons with 4 carbon atoms in a straight chain with chlorine in the presence of ferric chloride as a catalyst to cause both the splitting-off of HCl and the addition of chlorine, till no more HCl is split off and no more chlorine is added.

2. Process for producing a carbon-chloride of the formula $C_4Cl_6$ which comprises heating distillation residues of technical tetrachloroethane from which the lowest and highest boiling components have been distilled off, and which contain chlorinated hydrocarbons with four carbon atoms in a straight chain, with chlorine in the presence of ferric chloride as a catalyst to cause both the splitting-off of HCl and the addition of chlorine till no more HCl is split off and no more chlorine is added.

3. Process for producing a carbon-chloride of the formula $C_4Cl_6$ which comprises heating distillation residues of technical trichlorethylene from which the lowest and highest boiling components have been distilled off, and which contain chlorinated hydrocarbons with four carbon atoms in a straight chain, with chlorine in the presence of ferric chloride as a catalyst to cause both the splitting-off of HCl and the addition of chlorine till no more HCl is split off and no more chlorine is added.

4. Process for producing a carbon-chloride of the formula $C_4Cl_6$ which comprises heating waste products of chemical processes and distillations containing chlorinated hydrocarbons with 4 carbon atoms in a straight chain with chlorine in the presence of ferric chloride as a catalyst to cause both the splitting-off of HCl and the addition of chlorine till no more HCl is split off and no more chlorine is added, and fractionating the obtained mixture of the carbon-chloride $C_4Cl_6$ and hexachlorethane in the presence of a solvent for hexachlorethane having a boiling point near to the boiling point of hexachlorethane.

5. Process for producing a carbon-chloride of the formula $C_4Cl_6$ which comprises heating waste products of chemical processes and distillations containing chlorinated hydrocarbons with 4 carbon atoms in a straight chain with chlorine in the presence of ferric chloride as a catalyst to cause both the splitting-off of HCl and the addition of chlorine till no more HCl is split off and no more chlorine is added, and fractionating the obtained mixture of the carbon-chloride $C_4Cl_6$ and hexachlorethane in a tube while spraying water on the inner wall of the tube.

JOSEF WIMMER.